US010997679B2

(12) United States Patent
Shirasaka et al.

(10) Patent No.: US 10,997,679 B2
(45) Date of Patent: May 4, 2021

(54) PATENT MAP DISPLAY DEVICE, PATENT MAP DISPLAY METHOD, AND COMPUTER-READABLE RECORDING MEDIUM INCLUDING PATENT MAP DISPLAY PROGRAM STORED THEREIN

(71) Applicant: AI Samurai Inc., Tokyo (JP)

(72) Inventors: Hajime Shirasaka, Tokyo (JP); Takashi Mikami, Tokyo (JP); Rieko Harima, Tokyo (JP); Hiroyuki Ozone, Tokyo (JP)

(73) Assignee: AI Samurai Inc., Tokyo (JP)

( * ) Notice: Subject to any disclaimer, the term of this patent is extended or adjusted under 35 U.S.C. 154(b) by 0 days.

(21) Appl. No.: 16/698,630

(22) Filed: Nov. 27, 2019

(65) Prior Publication Data

US 2020/0184585 A1    Jun. 11, 2020

Related U.S. Application Data

(63) Continuation of application No. PCT/JP2018/045581, filed on Dec. 11, 2018.

(51) Int. Cl.
*G06Q 50/18* (2012.01)
*G06T 11/60* (2006.01)
(Continued)

(52) U.S. Cl.
CPC ......... *G06Q 50/184* (2013.01); *G06F 16/287* (2019.01); *G06F 16/29* (2019.01);
(Continued)

(58) Field of Classification Search
None
See application file for complete search history.

(56) References Cited

U.S. PATENT DOCUMENTS 7,966,328 B2 *   6/2011   Germeraad ............ G06Q 10/10
                                                      707/737
2003/0187874 A1 *  10/2003  Peschel ................. G06Q 10/10
(Continued)

FOREIGN PATENT DOCUMENTS

JP        2004005671 A      1/2004
JP        2006-013780 A     1/2006
(Continued)

OTHER PUBLICATIONS

"Chen, Design Patent Map Visualization Display, Apr. 2009" (Year: 2009).*
(Continued)

*Primary Examiner* — Hilina K Demeter
(74) *Attorney, Agent, or Firm* — Alston & Bird LLP

(57) ABSTRACT

A patent map display device of the present invention is a patent map display device that displays a patent map on a user terminal that can be operated by a user and includes an information acquisition unit that acquires instruction information input to the user terminal by the user, a bibliographic DB that stores prior patent information, an analysis unit including a comparison section that compares the instruction information with the patent information and an evaluation section that performs patent evaluation of the instruction information by comparing the instruction information with the patent information on the basis of the comparison section, a patent map generation unit including a generation section that generates a map and a character representing an attribute related to an analysis result of the instruction information on the basis of attribute information including the patent evaluation and a disposition section that disposes the character in the map, and a display unit that displays a patent map generated by the patent map generation unit.

20 Claims, 14 Drawing Sheets

(51) Int. Cl.
  *G06T 11/00*    (2006.01)
  *G06F 16/29*    (2019.01)
  *G06F 16/28*    (2019.01)
  *G06T 11/20*    (2006.01)
  *G06N 20/00*    (2019.01)

(52) U.S. Cl.
  CPC .......... *G06T 11/001* (2013.01); *G06T 11/206* (2013.01); *G06T 11/60* (2013.01); *G06F 2216/11* (2013.01); *G06N 20/00* (2019.01)

(56) References Cited

U.S. PATENT DOCUMENTS

2013/0086046 A1\* 4/2013 Lundberg ................ G06F 16/93
                                                            707/722
2016/0048936 A1\* 2/2016 Perkowski ........... G06Q 50/184
                                                            705/310

FOREIGN PATENT DOCUMENTS

| JP | 2010541111 A | 12/2010 |
| JP | 2013025702 A | 2/2013 |
| JP | 2015125484 A | 7/2015 |

OTHER PUBLICATIONS

International Search Report for Application No. PCT/3112018/045581 dated Mar. 26, 2019.

\* cited by examiner

[Fig. 1]

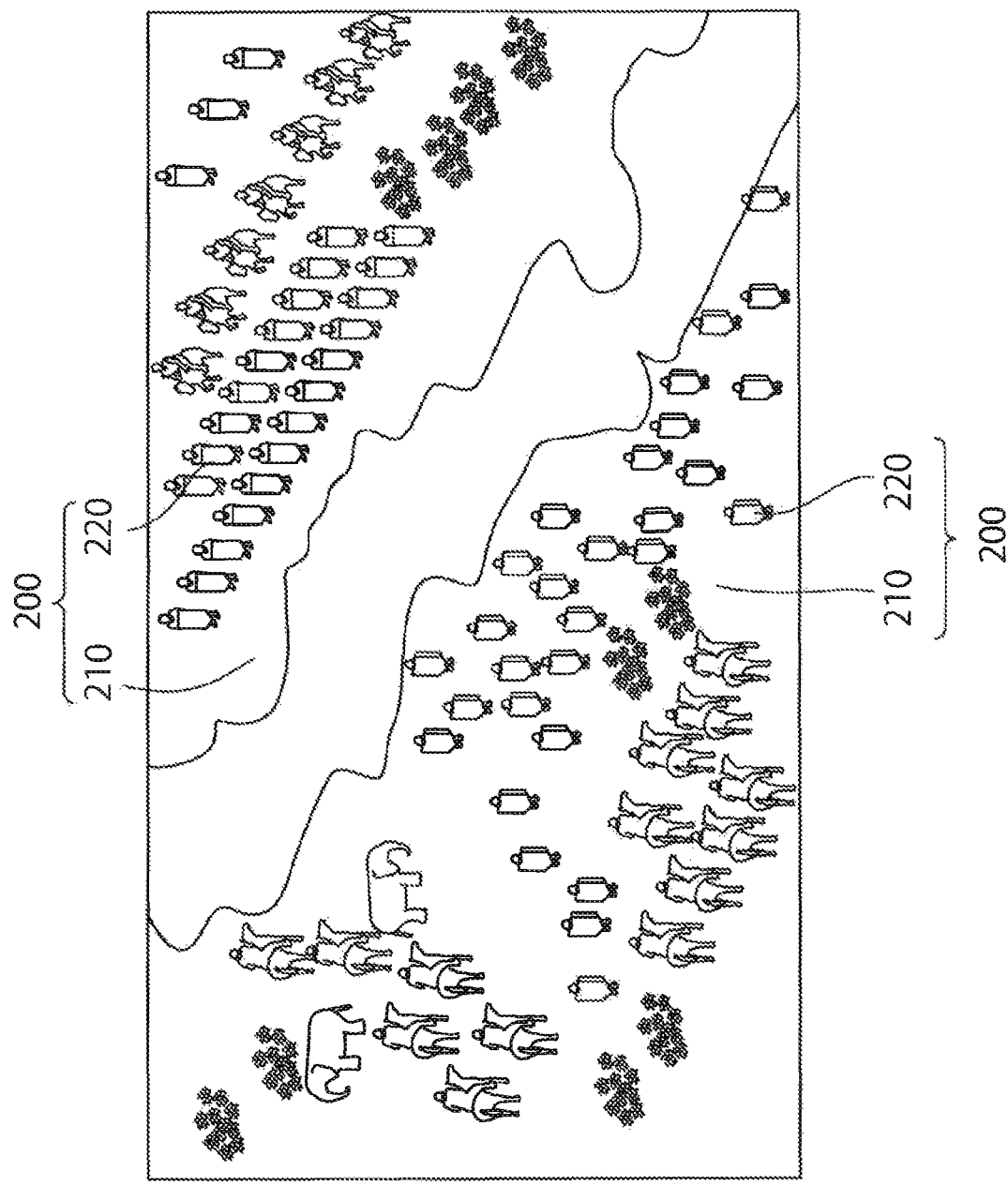
[Fig. 3]

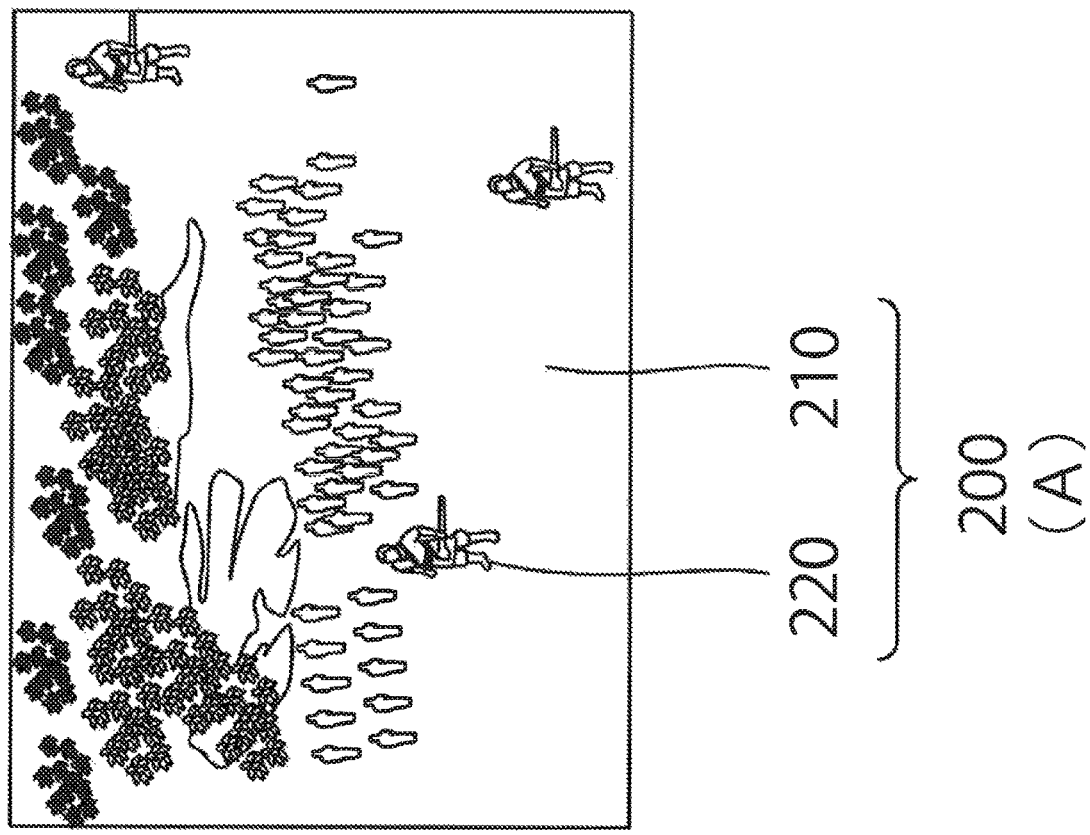
[Fig. 4A]

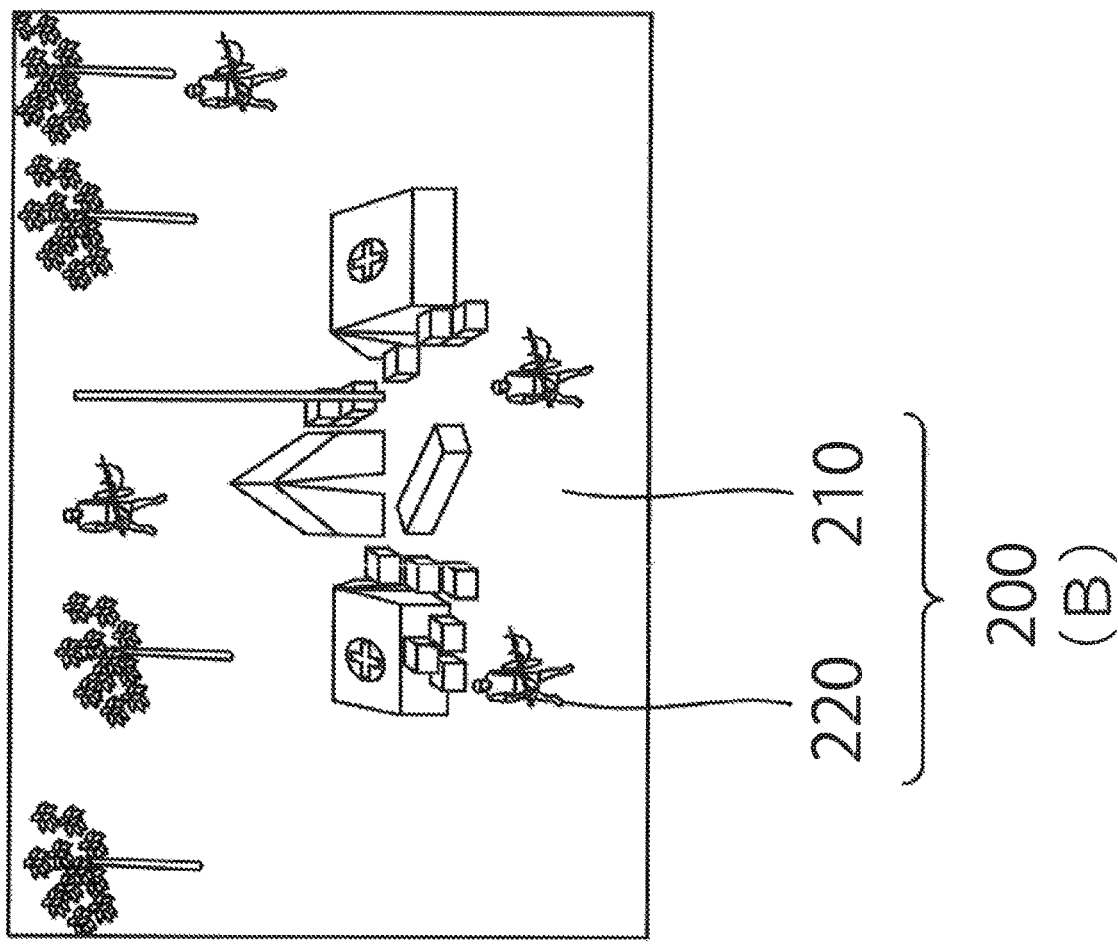

[Fig. 5A]
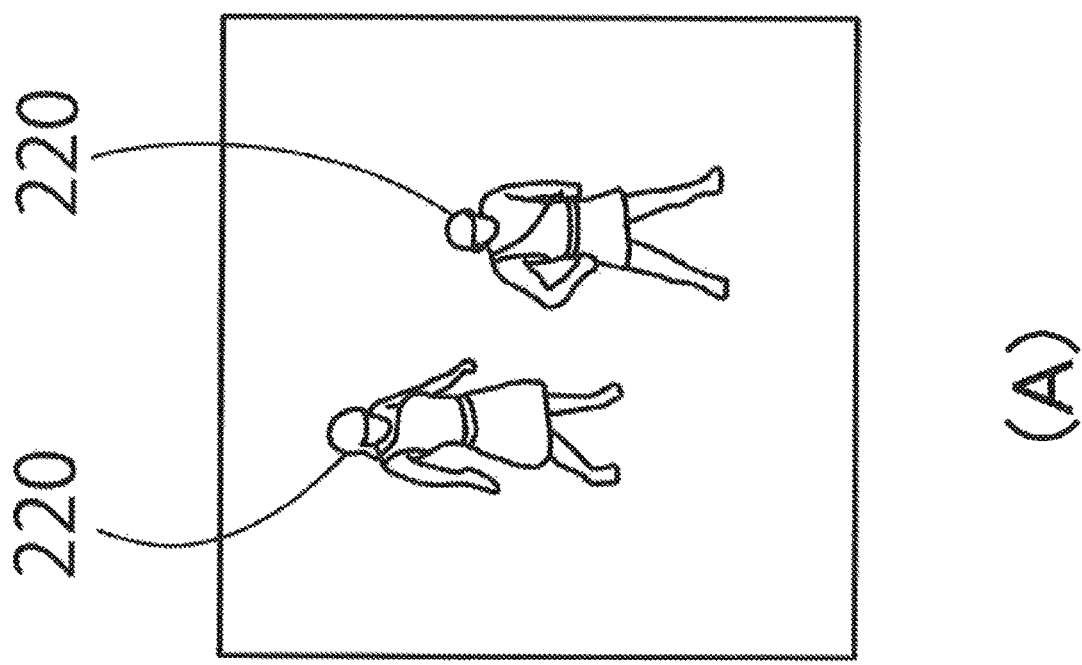
(A)

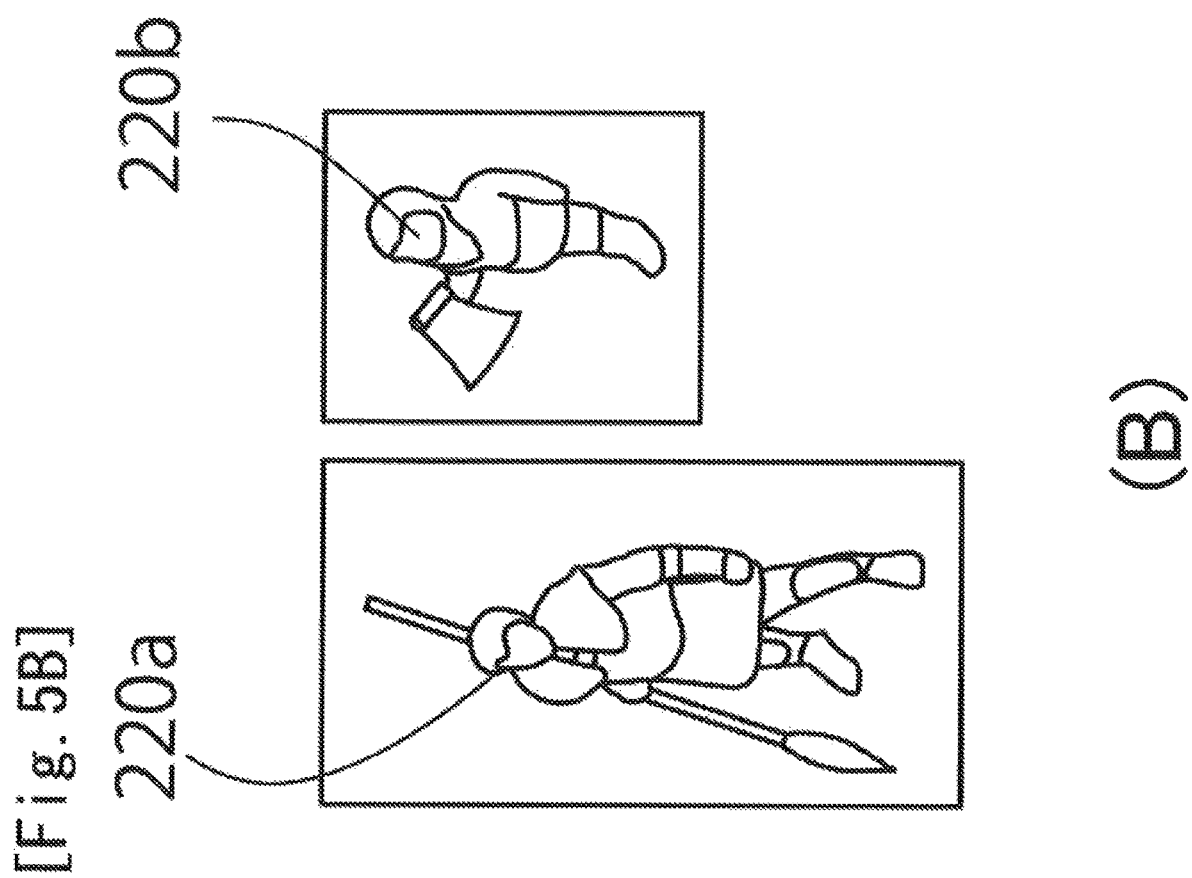
[Fig. 5B]

[Fig. 5C]
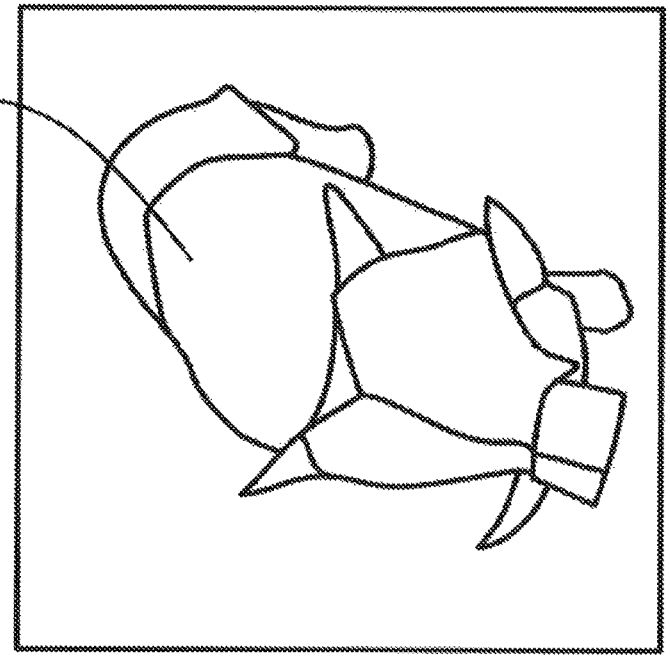
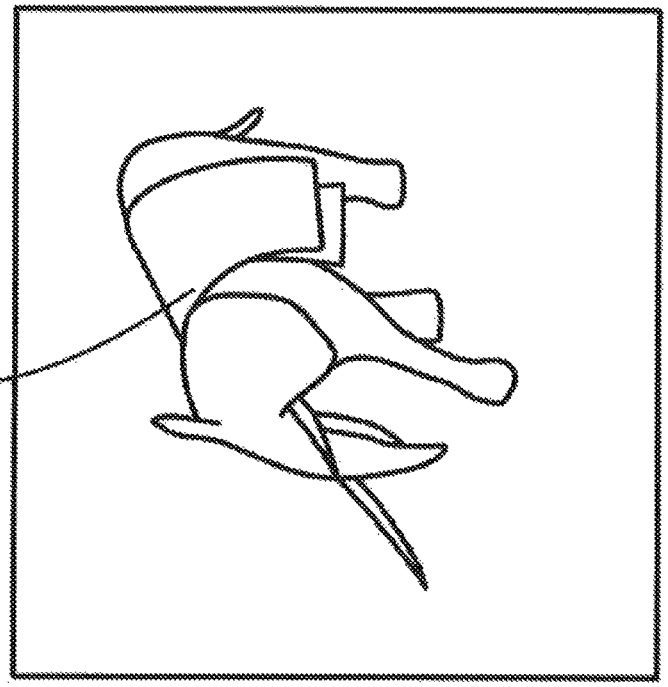
(c)

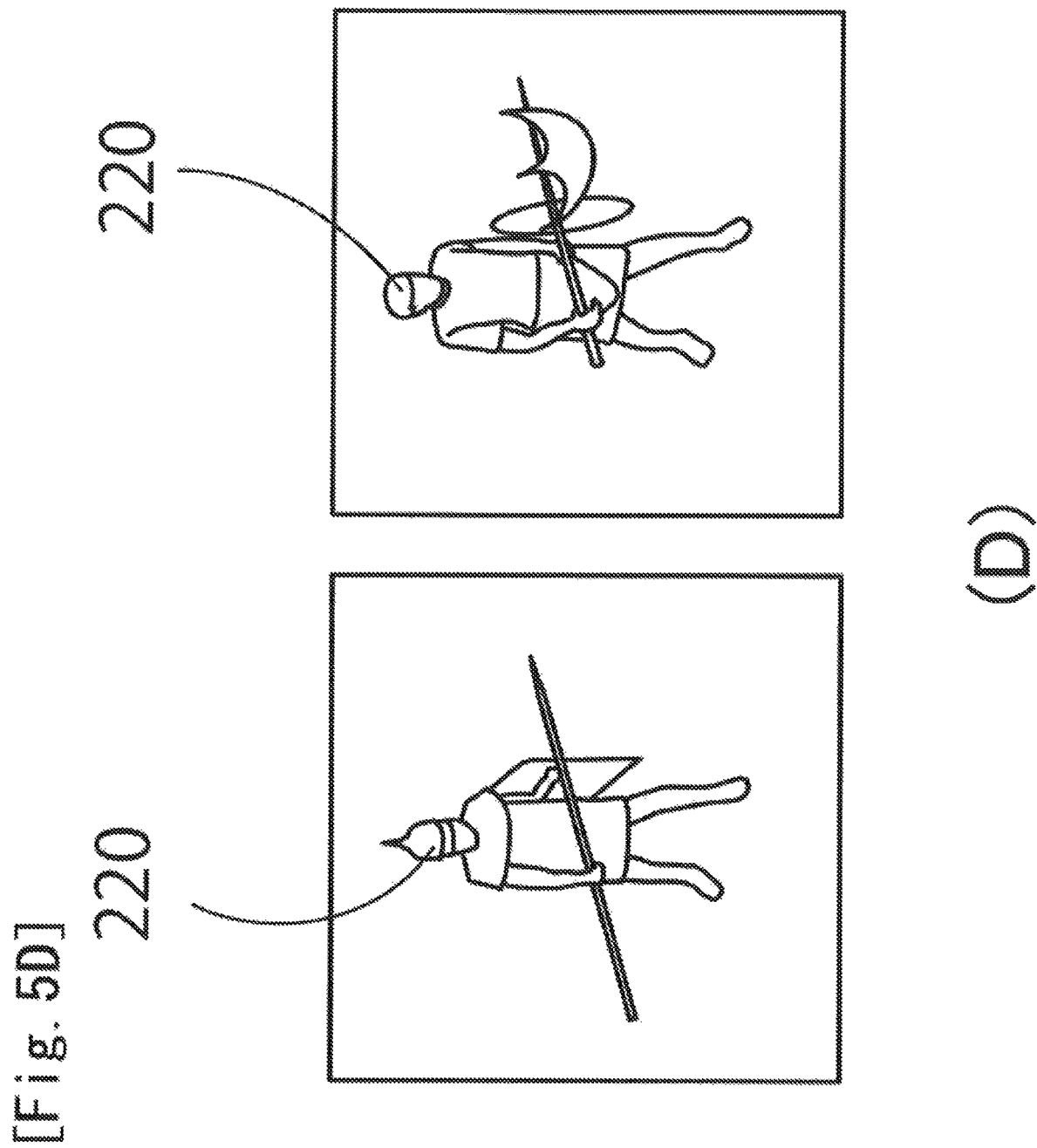
[Fig. 5D]

[Fig. 5E]
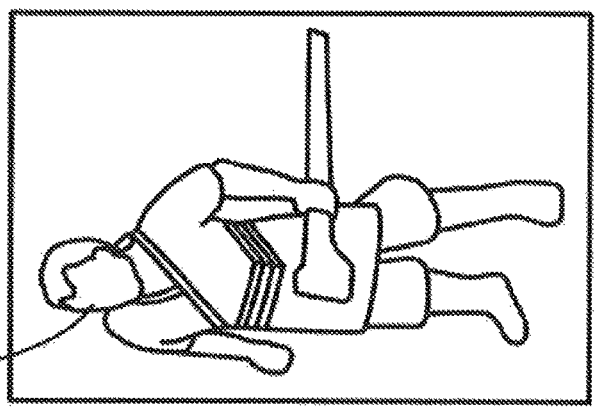
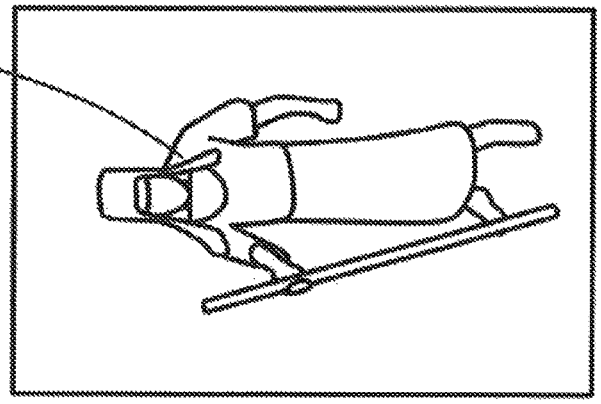
(E)

[Fig. 6]
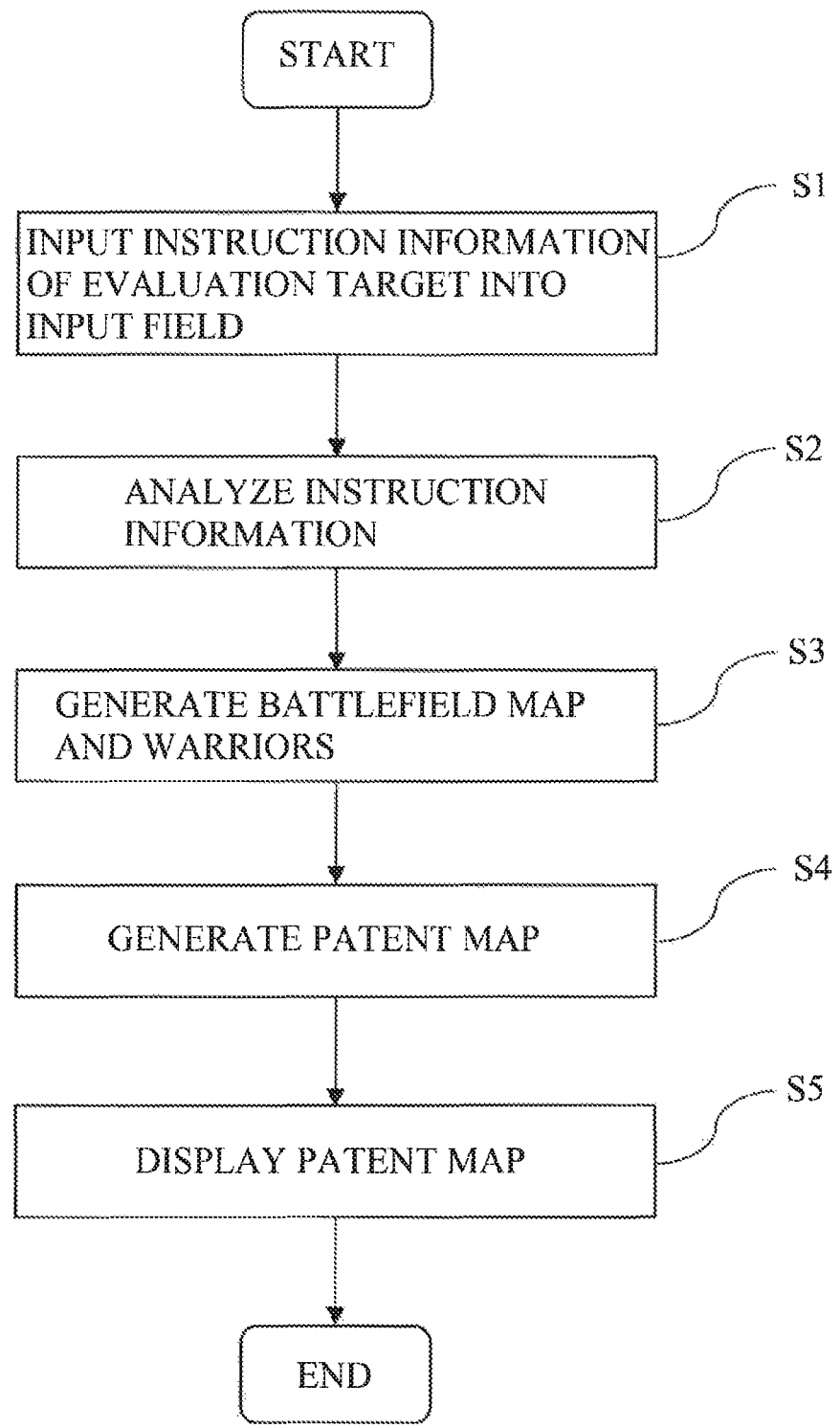

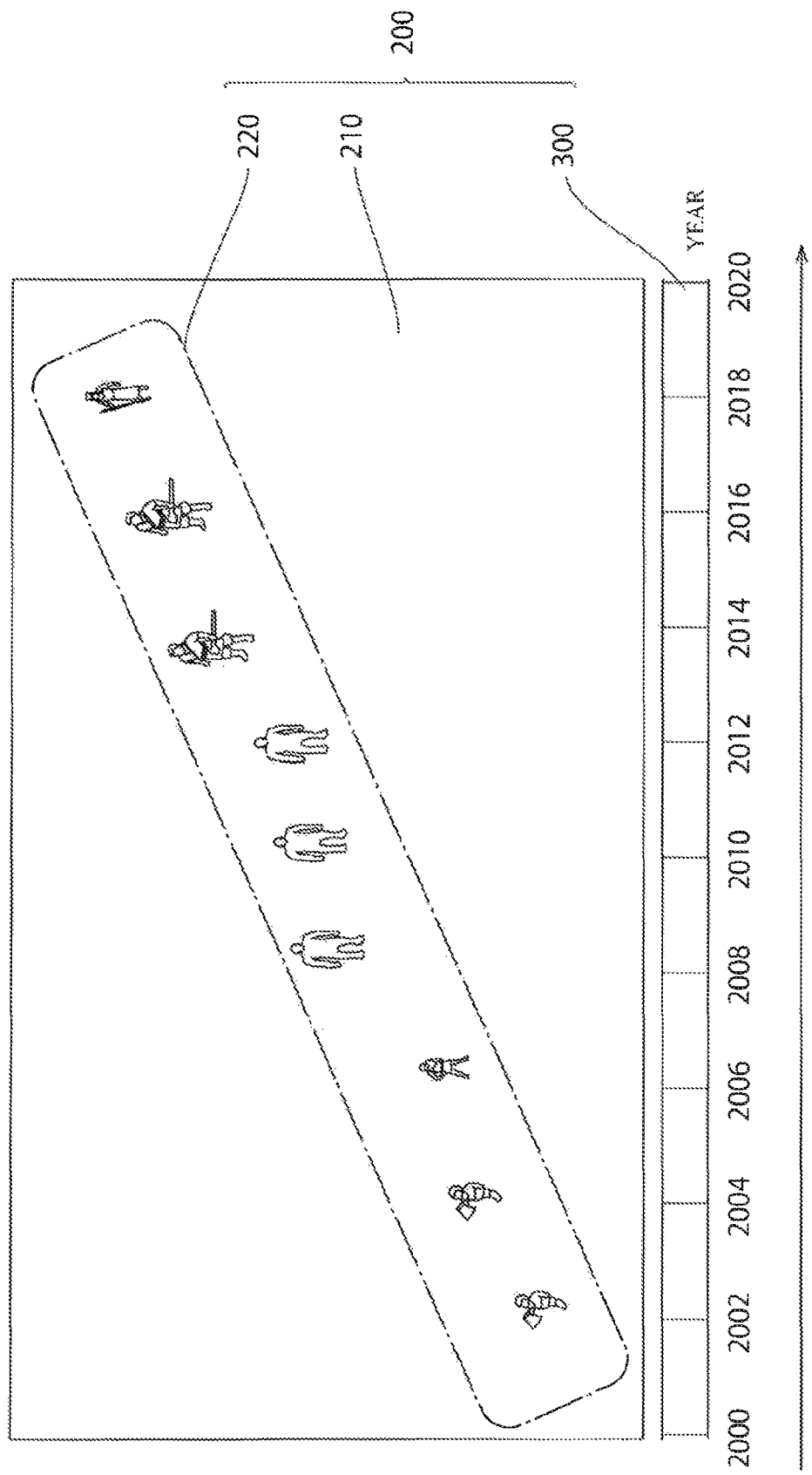
[Fig. 7]

[Fig. 8A]
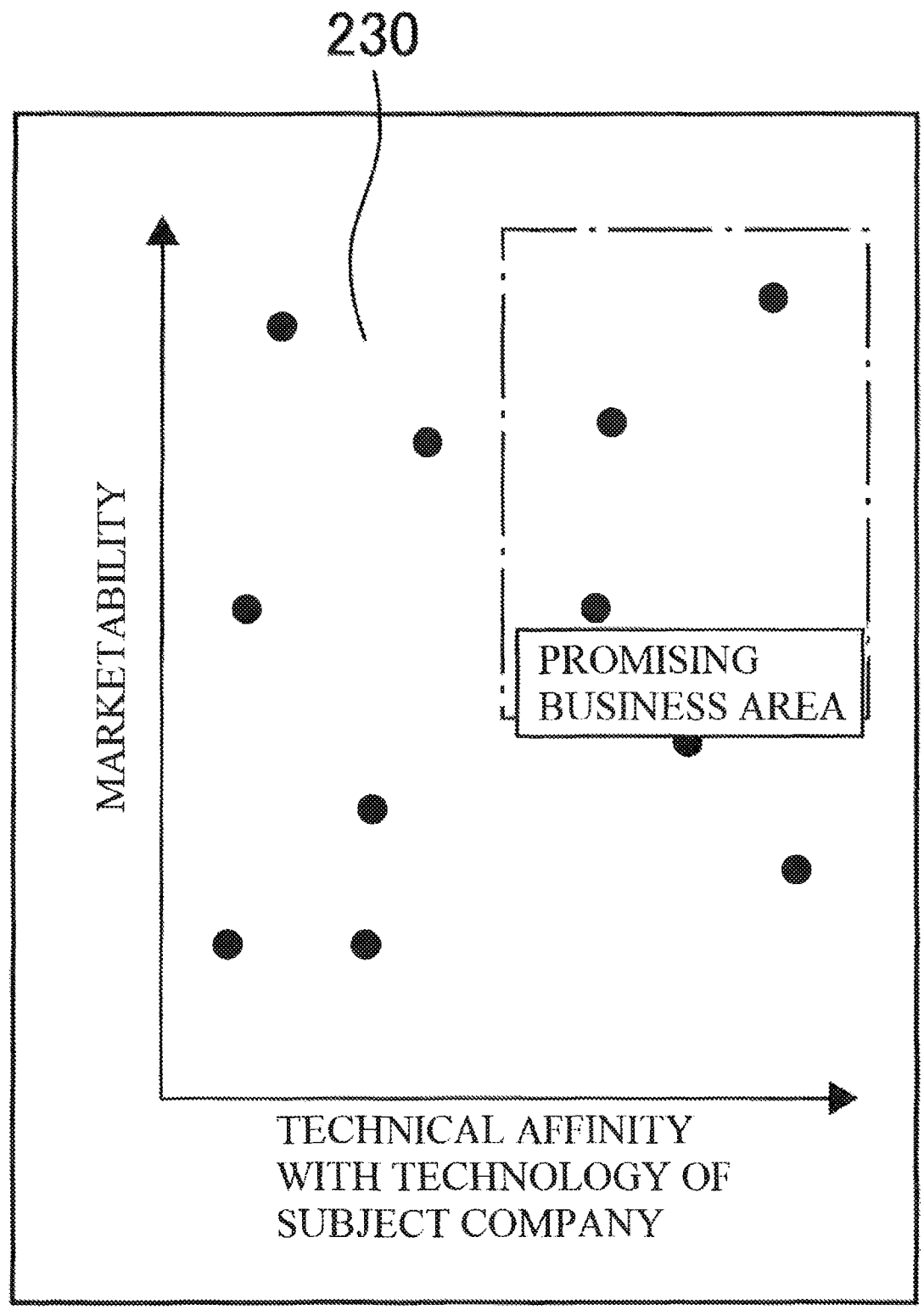
(A)

[Fig. 8B]
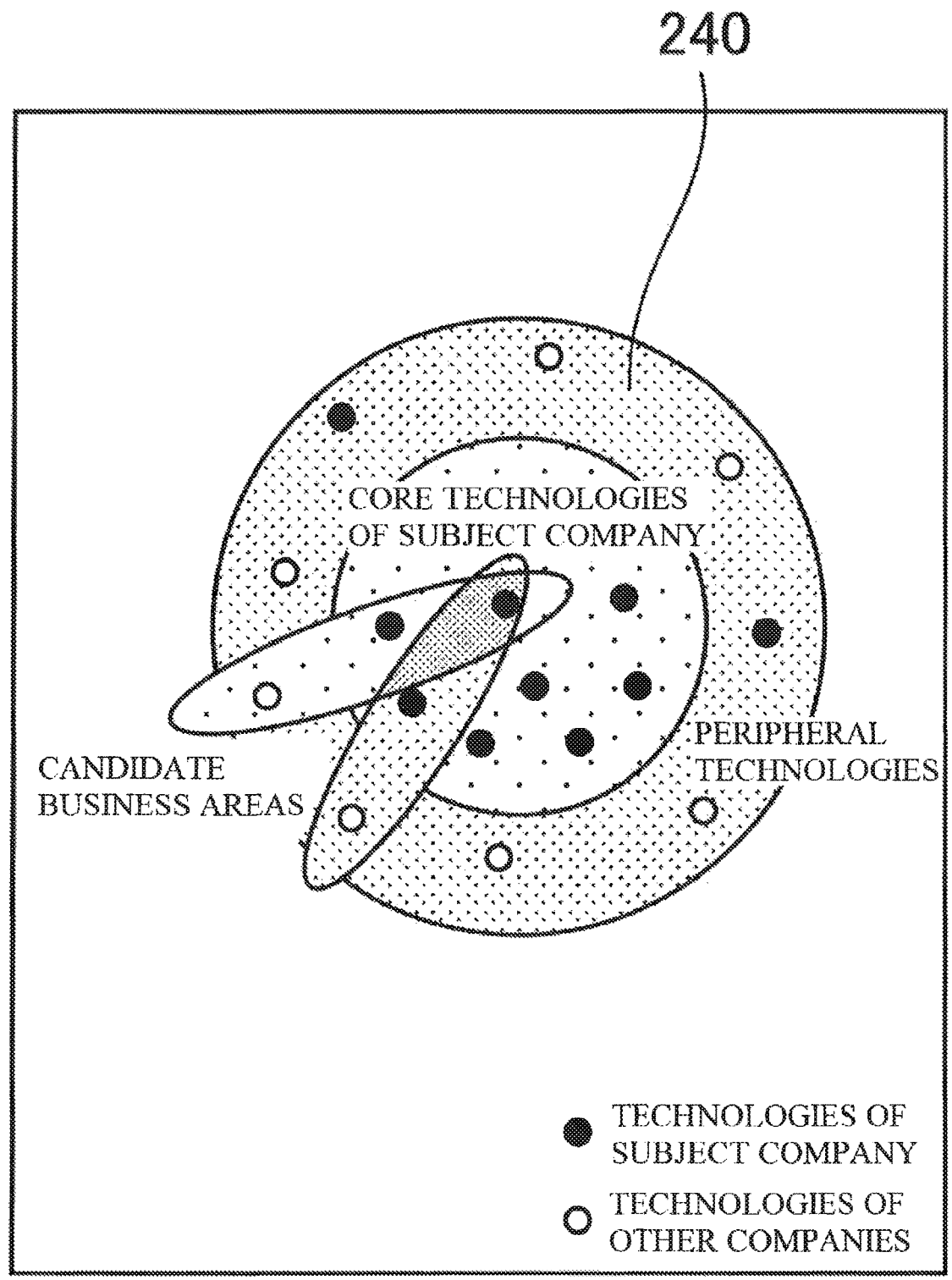
(B)

PATENT MAP DISPLAY DEVICE, PATENT MAP DISPLAY METHOD, AND COMPUTER-READABLE RECORDING MEDIUM INCLUDING PATENT MAP DISPLAY PROGRAM STORED THEREIN

CROSS-REFERENCE TO RELATED APPLICATIONS

The present application claims priority to and is a continuation of PCT/JP2018/045581, filed on Dec. 11, 2018 and entitled "PATENT MAP DISPLAY DEVICE, PATENT MAP DISPLAY METHOD, AND COMPUTER-READABLE RECORDING MEDIUM INCLUDING PATENT MAP DISPLAY PROGRAM STORED THEREIN", the content[s] of which is incorporated herein by reference in its entirety.

BACKGROUND

Field of the Invention

The present invention relates to a patent map display device, a patent map display method, and a computer-readable recording medium including a patent map display program stored therein.

BACKGROUND OF THE INVENTION

A device which generates a patent map visually showing patent evaluation has been developed recently. Publication of U.S. Pat. No. 7,966,328 discloses a technology of generating and displaying a patent map on the basis of a patent-related tool including attribute information such as topographic maps, inventors by companies, technology classifications, the number of patents, the number of applications, product/patent revenues, and the like.

SUMMARY

According to Publication of U.S. Pat. No. 7,966,328, it is possible to generate a patent map by automatically processing a very large amount of patent information and to obtain information enabling a status of a patent application to be ascertained from various perspectives.

However, the technology disclosed in Publication of U.S. Pat. No. 7,966,328 has a problem that it is hard to easily ascertain such attribute information of individual pieces of patent information.

Therefore, it is desired to develop a technology that enables display of a patent map by which attribute information related to individual pieces of patent information can be easily ascertained.

Therefore, it is desirable to provide a patent map display device, a patent map display method, and a computer-readable recording medium including a patent map display program stored therein that enable attribute information related to individual pieces of patent information to be easily ascertained.

A patent map display device according to an embodiment of the present invention is a patent map display device that displays a patent map on a user terminal that can be operated by a user and includes a bibliographic database that stores prior patent information, an information acquisition unit that acquires instruction information input to the user terminal by the user, an analysis unit including a comparison section that compares the instruction information with the patent information and an evaluation section that performs patent evaluation of the instruction information by comparing the instruction information with the patent information on the basis of the comparison section, a patent map generation unit including a generation section that generates a map and a character representing an attribute related to an analysis result of the instruction information on the basis of attribute information including the patent evaluation and a disposition section that disposes the character in the map, and a display unit that displays a patent map generated by the patent map generation unit.

The patent map display device according to an embodiment of the present invention may further include a totalizing unit that extracts and totalizes the number of pieces of the instruction information and the patent information and attribute information on the basis of the analysis result and a control unit that controls movement of the character, in which the character may be able to move on the map according to the analysis result, and the control unit may perform control such that the character moves in a wide area in a case where patent evaluation based on the analysis result is high and that a movement area of the character becomes narrower in a case where patent evaluation based on the analysis result is low.

In the patent map display device according to an embodiment of the present invention, the totalizing unit may have a function of totalizing the number of letters of the claims of the patent information, and the patent evaluation may be determined according to the number of letters of the claims of the patent information.

In the patent map display device according to an embodiment of the present invention, the patent map generation unit may determine an attribute related to the character on the basis of the attribute information, and the totalizing unit may determine the number of characters according to the number of pieces.

In the patent map display device according to an embodiment of the present invention, the totalizing unit may perform extraction and totalization on the analysis result for each of same inventors or applicants, and the patent map generation unit may dispose the characters close to each other for each of the same inventors or applicants on the basis of the extraction and totalization result.

In the patent map display device according to an embodiment of the present invention, the totalizing unit may perform extraction and totalization on the analysis result for each of different inventors or applicants, and the patent map generation unit may change a color of an outfit of the characters for each of different inventors or applicants on the basis of the extraction and totalization result.

In the patent map display device according to an embodiment of the present invention, the totalizing unit may perform extraction and totalization on a technology classification on the basis of the attribute information, and the patent map generation unit may determine an appearance of the characters for each of technically similar technology classifications on the basis of the extraction and totalization result and dispose the characters close to each other.

In the patent map display device according to an embodiment of the present invention, the totalizing unit may perform extraction and totalization on patent evaluation on the basis of the attribute information, and the patent map generation unit may determine a level of an item possessed by the character or the character for each occasion of the patent evaluation on the basis of the extraction and totalization result.

In the patent map display device according to an embodiment of the present invention, the totalizing unit may set a classification group for each of the technically similar technology classifications on the basis of the extraction and totalization result of the technology classifications, and the patent map generation unit may determine a topography of the map for each of the classification groups.

In the patent map display device according to an embodiment of the present invention, the attribute information may include a technology classification or time information, and the patent map generation unit may change the appearance of the characters and the topography of the map according to the technology classification or the time information.

In the patent map display device according to an embodiment of the present invention, the attribute information may include a technology classification or time information, and the patent map generation unit may dispose, on topographies of different maps for each of the classification groups, a character corresponding to the technology classification or the time information corresponding to the topography.

In the patent map display device according to an embodiment of the present invention, the patent map generation unit may have a function of generating an information bar representing a time axis indicating change of time, and the disposition section may dispose the character on the map according to passage of time and may be able to dispose the information bar in a direction of the passage of time.

In the patent map display device according to an embodiment of the present invention, the patent map generation unit may change a level of a character according to rank information of the patent evaluation.

In the patent map display device according to an embodiment of the present invention, when the rank information of the patent evaluation indicates a level equal to or higher than a predetermined level, the patent map generation unit may dispose a character in a shape simulating a warrior, a beast, a carnivore, a large animal, a tank, or a robot according to the level.

In the patent map display device according to an embodiment of the present invention, the analysis unit may identify an application country or a nationality of an inventor on the basis of the attribute information, and the patent map generation unit may change an outfit of the character to a national costume of the application country or the nationality of the inventor according to the application country or the nationality of the inventor.

In the patent map display device according to an embodiment of the present invention, the user may be able to include information of an organization to which the inventor belongs at a time of input of the instruction information, and the patent map generation unit may identify the organization to which the inventor belongs on the basis of the information of the organization and determine an outfit of the character for each organization.

In the patent map display device according to an embodiment of the present invention, the user may be able to include asset information of each organization to which the inventor belongs at the time of input of the instruction information, and the patent map generation unit may determine an accumulation amount of food of the character on the basis of the asset information and dispose the food in the accumulation amount in the map together with the character.

In the patent map display device according to an embodiment of the present invention, the analysis unit may identify a date of application on the basis of the attribute information, and the patent map generation unit may change an age of the character according to the identified date of application.

A patent map display method according to an embodiment of the present invention is a patent map display method for displaying a patent map on a user terminal that can be operated by a user, the patent map display method including a step of storing prior patent information in a bibliographic database, an input step of inputting instruction information by the user, an analysis step including a comparison step of comparing the instruction information with the patent information and an evaluation step of performing patent evaluation of the instruction information by comparing the instruction information with the patent information on the basis of the comparison step, a patent map generation step including a generation step of generating a map and a character representing an attribute related to an analysis result of the instruction information on the basis of attribute information including the patent evaluation and a disposition step of disposing the character in the map, and a display step of displaying a patent map generated from the patent map generation step.

A computer-readable recording medium according to an embodiment of the present invention is a computer-readable recording medium including a patent map display program for displaying a patent map on a user terminal that can be operated by a user stored therein, the patent map display program causing a computer to realize a function of storing prior patent information in a bibliographic database, an input function of inputting instruction information by the user, an analysis function including a comparison function of comparing the instruction information with the patent information and an evaluation function of performing patent evaluation of the instruction information by comparing the instruction information with the patent information on the basis of the comparison function, a patent map generation function including a generation function of generating a map and a character representing an attribute related to an analysis result of the instruction information on the basis of attribute information including the patent evaluation and a disposition function of disposing the character in the map, and a display function of displaying a patent map generated from the patent map generation function.

According to the present invention, attribute information related to individual pieces of patent information can be easily ascertained, and thus it is possible to provide a patent map by which technology trends can be more exactly ascertained even without specialized knowledge on intellectual property.

BRIEF DESCRIPTION OF THE DRAWINGS

FIG. 3 is a diagram illustrating an example of an aspect of a patent map output to a user terminal according to an embodiment of the present invention.

FIG. 4A is a schematic diagram illustrating an example of an aspect of a map according to a technology classification or time information according to an embodiment of the present invention.

FIG. 4B is a schematic diagram illustrating an example of an aspect of a map according to a technology classification or time information according to an embodiment of the present invention.

FIG. 5A shows diagrams illustrating examples of appearances of characters disposed on a map output to a user terminal according to an embodiment of the present invention.

FIG. 5B shows diagrams illustrating examples of appearances of characters disposed on a map output to a user terminal according to an embodiment of the present invention.

FIG. 5C shows diagrams illustrating examples of appearances of characters disposed on a map output to a user terminal according to an embodiment of the present invention.

FIG. 5D shows diagrams illustrating examples of appearances of characters disposed on a map output to a user terminal according to an embodiment of the present invention.

FIG. 5E shows diagrams illustrating examples of appearances of characters disposed on a map output to a user terminal according to an embodiment of the present invention.

FIG. 6 is a flowchart showing an example of a display operation of a patent map display device according to an embodiment of the present invention.

FIG. 7 is a diagram illustrating an example of an aspect in which a band-shaped information bar is displayed on a patent map.

FIG. 8A is an overhead view showing an example of an aspect of an analysis result of patent evaluation output to a user terminal according to an embodiment of the present invention.

FIG. 8B is a chart showing an example of an aspect of an analysis result of patent evaluation output to a user terminal according to an embodiment of the present invention.

DETAILED DESCRIPTION OF THE INVENTION

Figure 1:
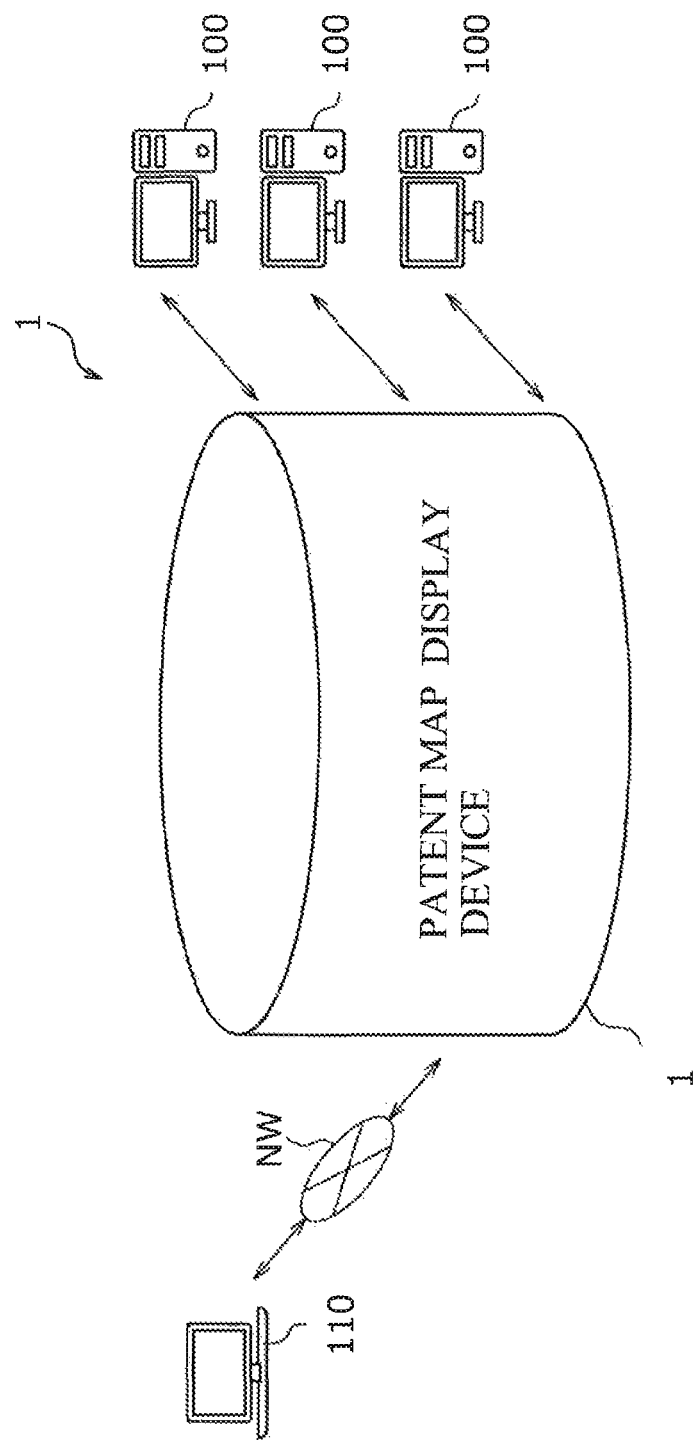
FIG. 1 is a diagram illustrating a configuration example of a patent map display device according to an embodiment of the present invention.

First, meanings of phrases and terms to be used in the specification of the present application will be defined.

A "patent" is an idea or a creation born from intellectual activities of human beings. In addition, information related to a patent (which will be referred to as "patent information" below) may be, for example, a document for explaining the contents of the patent, a diagram, a table, a graph, a sketch, or a picture (including a diagram) for describing the contents of the patent, a document describing a diagram, or the like. Patent information in the present embodiment is information for determining a possibility of acquiring rights to the above-described patent. A right to a patent is a patent right. Information for determining a possibility of acquiring rights to a patent is information for judging whether patent requirements are satisfied. Such information for determining a possibility of acquiring rights includes sentences indicating the contents of the invention (the description of the claims, a task or an objective of the invention, or the like), information of diagrams, and the like. In addition, patent information includes not only published patent applications and registered patents of which rights have been registered and issued, but also unpublished patents of applicants and ideas for which an application has been abandoned.

In addition, "instruction information" is information indicating the contents of a technology to be evaluated and includes keywords by which the technical contents can be identified. Instruction information is, for example, information related to research, patent information, and the like. Information related to research may be original drafts of papers, memos in which information related to the research is described, keywords related to the research, or documents such as papers that have been written or are being written. Patent information may be original drafts of patent applications, memos in which information related to the invention is described, keywords related to the invention, patent applications that have been created or are being created, or documents of applications for utility model registration, or the like.

In addition, "attribute information" is a plurality of kinds of information indicating attributes that make up forms such as a topography of a map and an appearance of characters. Attribute information includes, for example, patent evaluation, rank information, level information, the date of idea creation, the date of issue of a published application, the date of submission of application documents related to the published application (i.e., the date of application), the date of publication, the date of registration, the date of issue, the number of notifications of reasons for rejection received with respect to the published application, the contents of the notifications of reasons for rejection, the contents of responses to the notifications of reasons for rejection, the number of amendments made for the published application, the contents of the amendments, the number of letters of independent claims, the number of claims, the remaining duration, information of validity or invalidity of rights, and the like. A patent map display device generates a map and a character representing an attribute, the map and the character related to an analysis result of instruction information based on attribute information including patent evaluation.

In addition, a patent mentioned in the present embodiment also includes a utility model. That is, since a patent map display device 1 according to the present embodiment is applied to patents and utility models, they are simply referred to as patents.

Embodiments of the present invention will be described with reference to the drawings.

FIG. 1 is a diagram illustrating a configuration example of a patent map display device 1 according to an embodiment of the present invention. The patent map display device 1 is a device that is connected to a user terminal 100 to display a patent map on the user terminal 100 as illustrated in FIG. 1. The patent map display device 1 according to the present embodiment can cause the patent map to be displayed on the user terminal 100. Examples of the user terminal 100 include terminals that can be operated by a user such as, for example, a personal computer, an iPad (registered trademark), a tablet PC, a smartphone, and the like. The patent map display device 1 is connected to a database 110 of a patent office and the like via a network NW and can acquire patent information. The patent information acquired as above is stored in a bibliographic database (DB) 20 (see FIG. 2) included in the patent map display device 1. Further, patent information may be input by causing patent information in the database 110 of the patent office or the like to be stored in a storage medium that can store information and connecting or inserting the storage medium to or into the patent map display device 1. Examples of the storage medium include, for example, a magnetic storage device such as a hard disk, a Floppy (registered trademark) disk, or a magnetic strip, an optical disc such as a compact disc (CD) or a DVD, a smart card, a flash memory device, and the like.

Figure 2:
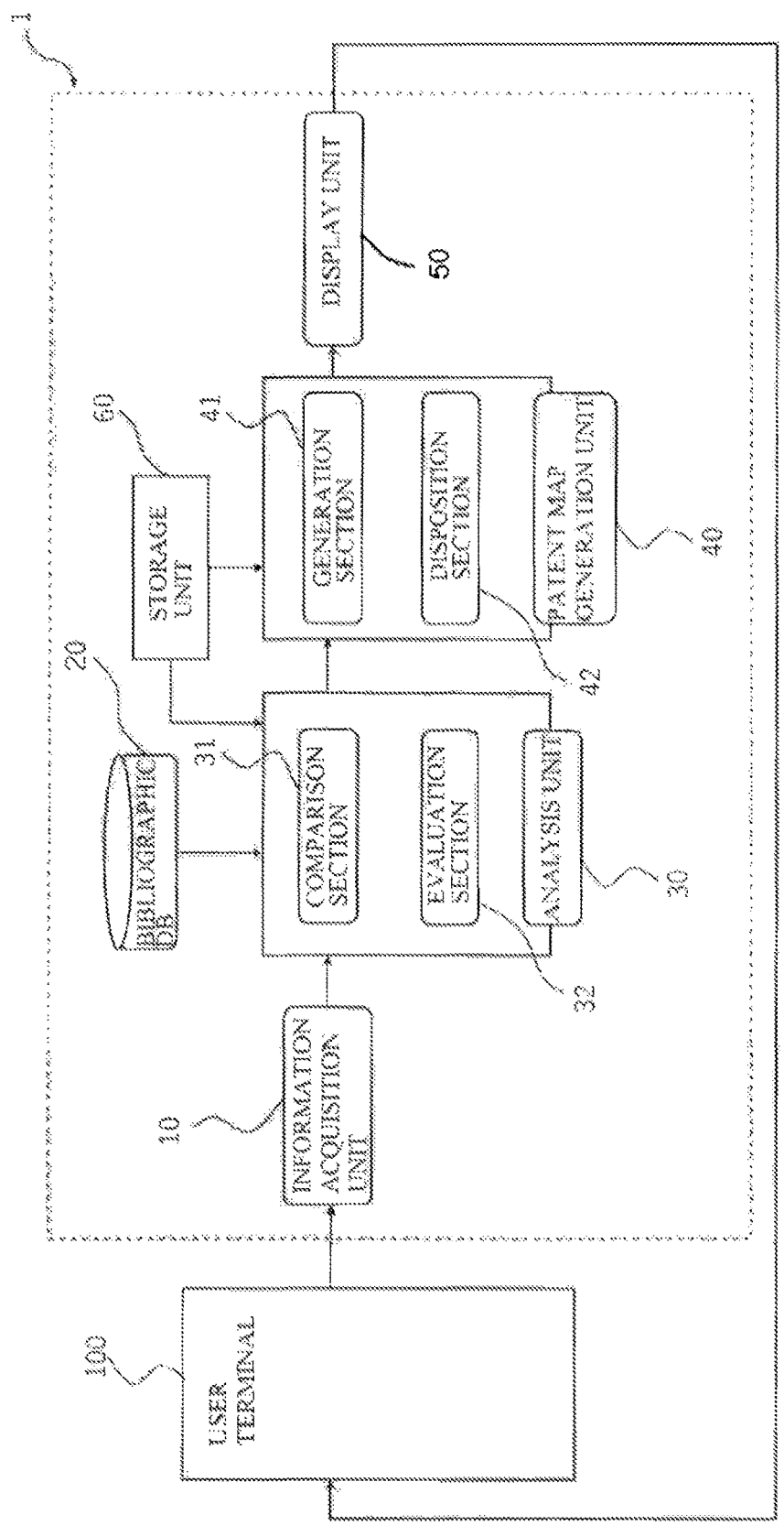
FIG. 2 is a block diagram illustrating the patent map display device according to an embodiment of the present invention.

FIG. 2 is a block diagram illustrating the patent map display device 1 according to an embodiment of the present invention. The patent map display device 1 includes an information acquisition unit 10, the bibliographic database 20, an analysis unit 30, a patent map generation unit 40, a display unit 50, and a storage unit 60 as illustrated in FIG. 2.

When information indicating technical contents representing an evaluation target (which will be referred to as "instruction information" below) is input to an input field of the user terminal 100, the patent map display device 1 acquires the instruction information. The acquisition of the instruction information is performed by the information acquisition unit 10. The instruction information acquired by the information acquisition unit 10 is input to the analysis unit 30 and is subjected to a predetermined analysis process. The analysis unit 30 includes a comparison section 31 and an evaluation section 32. The comparison section 31 compares the instruction information input to the user terminal 100 with a plurality of pieces of prior patent information stored in the bibliographic database 20. The instruction information is evaluated by inputting the comparison result to the evaluation section 32. The evaluation can include a possibility of acquiring rights of the instruction information representing the evaluation target.

The evaluation is performed by, for example, computing a score of a degree of matching between the instruction information representing the evaluation target of the user and a plurality of pieces of prior patent information and using a score obtained by computing a degree of matching of each of configuration requirements through machine learning. A score may be denoted by a symbol such as, for example, "S," "A," "B," or "C" according to a degree of matching, and "S," "A," "B," and "C" may mean "not described at all," "not similar," "a little similar," and "the same" respectively.

The evaluation section 32 may generate in advance learning data to be used in the machine learning using the plurality of pieces of prior patent information and evaluate the instruction information using the learning data and the plurality of pieces of patent information.

In addition, the evaluation section 32 may evaluate the instruction information by using a model that is machine-learned using the plurality of pieces of prior patent information.

In addition, the evaluation section 32 may give feedback on the analysis result of instruction information representing an evaluation target that was evaluated in the past and store the analysis result in the storage unit 60 and may use the analysis result for machine learning. Accordingly, the evaluation section 32 can perform more highly accurate evaluation.

As described above, the evaluation section 32 enables evaluation that is likely to bring a result closer to an actual examination result by comparing the instruction information input to the input field by the user with the plurality of pieces of prior patent information and evaluating the instruction information. That is, for the instruction information representing the evaluation target, comparison and evaluation of bibliographic information including technical wordings that are different but indicate the same meaning are possible and thus evaluation that is likely to bring a result closer to an actual examination result is possible. The analysis results based on comparison and evaluation are extracted and subjected to a totalizing process. Then, the result is input to the patent map generation unit 40. The patent map display device 1 may also include a totalizing unit (not illustrated) that performs extraction and a totalizing process on analysis results.

The patent map generation unit 40 is constituted by a generation section 41 and a disposition section 42. The generation section 41 generates a map 210 and characters 220 constituting a patent map 200 and thereby generates the patent map 200 by disposing the characters 220 in the map 210. Details thereof will be described below.

Then, the display unit 50 performs display of the generated patent map 200 on the user terminal 100. For example, when the display unit 50 issues an output instruction to the patent map generation unit 40, an image of the patent map 200 is output to the user terminal 100, and a display process thereof is performed.

The storage unit 60 has a function of storing various programs and data necessary for operations of the patent map display device 1. The storage unit 60 is various recording media such as, for example, a hard disk drive (HDD), a solid-state drive (SSD), and a flash memory.

Further, the display of the patent map 200 can be stored in the storage unit 60 in association with a searched date and time thereof. The stored information can be displayed and viewed on the user terminal 100 at any time.

Specifically, the storage unit 60 can store the instruction information indicating technical contents representing the evaluation target input to the user terminal 100, similar patent information detected based on the instruction information, information of the map 210, the characters 220, and the like, which will be described below.

The patent map display device 1 can search for (extract) patent information of similar patents from patent information stored in the bibliographic database 20 when the user causes a program to be executed and only inputs the technical contents representing the evaluation target thereto. Then, each piece of the extracted patent information is subjected to a predetermined analysis process by the analysis unit 30, thereby a patent map is generated, and then the patent map 200 is displayed on the user terminal 100.

According to the above-described configuration, information obtained by the patent map display device 1 can be easily given to the user such that the information can be easily understood, and even a user who is lacking in technical knowledge can obtain information related to the technology that is easy to understand and trends of the information.

FIG. 3 is a schematic diagram illustrating a patent map according to a first embodiment of the present invention. A patent map refers to material visualized by means of a diagram, a graph, a table, or the like to efficiently depict only necessary information from an enormous amount of information normally after performing a prior art search, a technology trend survey, and the like. In other words, a patent map refers to a tool for analyzing time series trends of applicants or patent classifications by drawing a diagram, a graph, a table, and the like of the trends when it is desired to extract the applicants and patent classifications as a specific technical information set from an enormous amount of patent information.

As described above, a patent map is a diagram, a graph, a table, or the like that visually indicates time series trends of applicants and patent classifications of a specific technology information set. In other words, a patent map refers to a mapping display in which diagrams, graphs, tables, and the like are drawn as guideposts to help technology trends be visually understandable, and specific technical information sets, time series information, and the like are schematically illustrated in a combination of shapes, symbols, characters, and the like on a plane.

In the present embodiment, the patent map 200 is constituted by the map 210 and the characters 220. The characters 220 represent indicators of various kinds of technical information (instruction information, patent information, etc.), and the map 210 represents a drawing area in which the characters 220 are disposed. As illustrated in FIG. 3, the map 210 shows a shape of a virtual battlefield that is set to have a topography of a virtual battlefield (which will be referred to as a "battlefield map" below), and each of the characters 220 indicates a warrior who fights in the virtual battlefield (which will be simply referred to as a "warrior" below). The patent map 200 according to the present embodiment is a map in which the warriors 220 are schematically illustrated on a plane by being disposed in the battlefield map 210 so as to be visually displayed. A plurality of kinds of battlefield maps 210 and warriors 220 are stored in the storage unit 60.

The storage unit 60 stores a variety of types of battlefield maps 210 and warriors 220 according to attributes based on analysis results of the analysis unit 30. The generation section 41 generates (extracts) shapes of a battlefield map 210 and warriors 220 according to attributes from the variety of types of battlefield maps 210 and warriors 220 stored in the storage unit 60. Then, the disposition section 42 disposes the warriors 220 in the generated battlefield map 210. The disposition is determined on the basis of attribute information such as, for example, the date of application, the technology classification, and the like. The determination is made by the disposition section 42. Next, the disposition section 42 disposes forms of the topography of the battlefield map 210 and appearances of the warriors 220, and the like according to the attribute information including the dates of application and the technology classification from the variety of types of battlefield maps 210 and warriors 220 stored in the storage unit 60. The attribute information including the dates of application, the technology classification, and the like are respectively associated with the variety of types of battlefield maps 210 and warriors 220 stored in the storage unit 60.

The totalizing unit (not illustrated) may set a classification group for each of technology classifications that are technically similar to each other on the basis of the result obtained by extracting and totalizing the technology classifications. In a case where technology classification refers to, for example, International Patent Classification (IPC), classification groups refer to technically similar sections that are divided into eight including "Section A: Human Necessities," "Section B: Performing Operations, Transporting," "Section C: Chemistry, Metallurgy," "Section D: Textiles, Paper," "Section E: Fixed Constructions," "Section F: Mechanical Engineering, Lighting, Heating, Weapons, Blasting," "Section G: Physics," and "Section H: Electricity." In addition, the generation section 41 may determine a topography of the battlefield map 210 for each of the classification groups. By determining each type of topography of the battlefield map 210 on the basis of the eight classification groups, technology trends of similar technology classifications can be instantaneously ascertained. The disposition section 42 may set the disposition of the warriors 220 for each of technical areas of technology classifications (classification groups). Further, appearances of the warriors 220 may be determined for each of the classification groups. In addition, the technology classification is not limited to that of the IPC and may be File Index (FI), F-Term, Cooperative Patent Classification (CPC), or the like.

Attributes of the warriors 220 and the number of warriors 220 according to the number of patents are determined on the basis of the analysis result obtained from the comparison and evaluation. The display unit 50 performs a display process of causing the patent map 200 to be displayed on the user terminal 100. For example, the generation section 41 may determine attributes of the warriors 220, and the totalizing unit (not illustrated) may determine the number of the warriors 220.

FIG. 4 shows schematic diagrams illustrating topographies of maps according to a technology classification or time information according to an embodiment of the present invention.

A plurality of types of battlefield maps 210 and warriors 220 are stored in the storage unit 60 and thus topographies of the battlefield maps 210 and appearances of the warriors 220 are generated as illustrated in FIGS. 4A and 4B according to technology classifications or time information such as the dates of application, the dates of registration, the dates of idea creation, and the like. A technology classification or time information may be determined on the basis of attribute information based on the result of the analysis process. Attribute information such as technology classifications, time information, and the like are stored in the storage unit 60 in association with the battlefield maps 210 and the warriors 220 and thus the battlefield map 210 and the warriors 220 can be generated according to the technology classifications or time information.

Further, a user can also input technology classification such as the IPC or time information such as the date of application in addition to technical contents indicating an evaluation target. Then, the generation section 41 may determine matched topography of the battlefield map 210 and appearances of the warriors 220 on the basis of the input technology classification or date of application.

Since the topography of the battlefield map 210 and the appearances of the warriors 220 change to various forms according to technology classification or time information, attributes and the number of the warriors 220 can be easily ascertained, and a part with no warriors 220 can be recognized as a blank area of the technical field.

In addition, the number of warriors 220 is determined according to the number of inventions. The number of the warriors 220 may be totalized by the totalizing unit (not illustrated).

A disposition relation of the warriors 220 is changed according to a degree of similarity in technical contents of patent information. For example, in a case where technical contents of patent information are similar, warriors may be disposed close to each other as illustrated in FIG. 5A. For example, appearances of warriors representing similar technical contents are mostly the same as or similar to each other, and such warriors with similar appearances may constitute a group. Thus, in a case where the warriors 220 representing similar technical contents are disposed in the battlefield map 210, they may be disposed in units of groups. If warriors are disposed close to each other as described above, sets of similar technical fields can be ascertained at a glance. Technical trends of a specific company can be visually recognized instantaneously. Determination on whether technical contents of patent information are similar to technical contents of instruction information is made using, for example, a degree of matching or a degree of similarity in the IPC given to the patent information. This determination is performed by the comparison section 31.

In addition, the generation section 41 can change the appearances of the warriors 220 according to a degree of matching or a degree of similarity between technical contents of the instruction information and the patent information similar thereto. For example, the appearances of the warriors 220 may be determined for each piece of technically similar technology classification in a case where an extraction and totalizing process is performed on the analysis result for each of the same inventors or applicants and the technical contents of the instruction information and the patent information have a similarity on the basis of the result of the extraction and totalization. In addition, the disposition section 42 may process the warriors to be disposed close to each other.

In addition, the attribute information may include the technology classification or time information such as the date of application, the date of registration, the date of idea creation, and the like, and the topography of the battlefield map 210 and the appearances of the warriors 220 may be changed according to not only a degree of similarity in technology classification but also a degree of approximation of time information. In addition, the generation section 41 generates (extracts) forms of the battlefield map 210 and the warriors 220 according to the attributes from the variety of types of battlefield maps 210 and warriors 220 stored in the storage unit 60. Next, the disposition section 42 disposes the warriors 220 on the topography of the battlefield map 210 corresponding to the attributes including the technology classification or the time information. For example, a color of an outfit of the warrior 220 may be changed according to the organization to which the inventor belongs. Pieces of the attribute information including the time information such as the date of application, the date of registration, and the like and the technology classification are associated with the variety of types of topography and the appearances of the warriors 220 stored in the storage unit 60, respectively.

Accordingly, technology trends of a specific inventor or applicant can be easily ascertained. Further, extraction and totalization are not limited for the same inventor or applicant but may be applied to each of different inventors or applicants. In this case, colors of outfits of the warriors 220 may be configured to be changed for each of the different inventors or applicants. For example, the generation section 41 may process a color of an outfit to be changed according to asset information of each company. Pieces of attribute information including the asset information are associated with forms such as the variety of types of topography and the appearances of the warriors 220 stored in the storage unit 60, respectively.

Furthermore, the generation section 41 may process colors of outfits of the warriors 220 to be changed according to login ID information of the patent map display device 1. The generation section 41 generates (extracts) forms of the battlefield map 210 and the warriors 220 according to the login ID information from the variety of types of battlefield maps 210 and warriors 220 stored in the storage unit 60. Next, the disposition section 42 disposes the warriors 220 on the topography of the battlefield map 210 corresponding to the login ID information. Pieces of attribute information including the login ID information are associated with the variety of types of topography and the appearances of the warriors 220 stored in the storage unit 60, respectively.

In addition, analysis results obtained from analysis of the analysis unit 30 may be extracted and totalized for each of different inventors or applicants, and the patent map generation unit 40 may change the colors of the outfits of the warriors 220 for each of the different inventors or applicants on the basis of the result of the extraction and totalization.

This method is effective to ascertain trends of a specific technical field among other companies or the subject company.

In addition, the analysis unit 30 may identify the dates of application from the attribute information, and the generation section 41 may process ages of the warriors 220 to be changed according to the identified dates of application as illustrated in FIG. 5B. Ages of the warriors 220 may be changed in order of the latest dates of application. For example, in a case where the date of application is recent, a young warrior 220*a* may be generated. In addition, in a case where the date of application is old, an elderly warrior 220*b* may be generated.

In addition, the generation section 41 may process levels of the warriors 220 to be changed according to rank information (which will be appropriately referred to as a "rank" below) of patent evaluation on the basis of the analysis result of the analysis unit 30. Each level may be determined on the basis of, for example, attribute information other than rank information. Next, the disposition section 42 disposes the warriors 220 on the topography of the battlefield map 210 corresponding to ranks of patent evaluation. Pieces of attribute information including the ranks in patent evaluation are associated with the variety of types of topography and the appearances of the warriors 220 stored in the storage unit 60, respectively.

The attribute information includes, in addition to the rank information, for example, the date of idea creation, the date of issue of published application, the date of submission of application documents for the published application (i.e., the date of application), the date of publication, the date of registration, the date of issue, the number of notifications of reasons for rejection received with respect to the published application, the contents of the notifications of reasons for rejection, the contents of responses to the notifications of reasons for rejection, the number of amendments made for the published application, the contents of the amendments, the number of letters of independent claims, the number of claims, the remaining duration, information of validity or invalidity of rights, and the like. A level is determined according to the pieces of the attribute information.

The storage unit 60 stores a plurality of types of warriors for each category of technology classification according to a technical field, and the generation section 41 extracts, from the storage unit 60, and generates the battlefield map 210 and the warriors 220 that match the instruction information and technology classification of a plurality of pieces of prior patent information. For example, the generation section 41 may generate the battlefield map 210 indicating a battlefield that matches historical backgrounds according to the instruction information and the times of the date of application, the date of publication, and the date of issue of the plurality of pieces of prior patent information from the battlefield maps stored in the storage unit 60.

In addition, in a case where a rank in patent evaluation is a predetermined level or higher, the warriors 220 in shapes simulating warriors, beasts, carnivores, large animals, tanks, or robots according to the level may be disposed in the battlefield map 210 as illustrated in FIG. 5C. The generation section 41 may configured to change appearances of the warriors 220 according to a level on the basis of the analysis results of the analysis unit 30. A level may be determined using, for example, the attribute information other than the rank information. Next, the disposition section 42 disposes the warriors 220 on the topography of the battlefield map 210 corresponding to the rank in patent evaluation. Pieces of attribute information including the rank in patent evaluation are associated with the variety of types of topography and the appearances of the warriors 220 stored in the storage unit 60, respectively.

In addition, the generation section 41 may change items of the warriors 220 into weapons such as a spear or an ax according to levels of the warriors 220 for each occasion of patent evaluation as illustrated in FIG. 5D. The items may be, for example, weapons such as axes or spears or may be food. The patent map generation unit 40 may determine an accumulation amount of the food of the warriors 220 on the basis of asset information of the organization to which the inventor belongs and the food in the accumulation amount may be disposed in the battlefield map 210 together with the warriors 220 which are patent information of the inventor. Here, the asset information refers to, for example, costs spent and profits earned for the invention. By disposing the food of the warriors 220 in the accumulation amount in the battlefield map 210 on the basis of the asset information, the value of the patent can be visually ascertained.

For example, in a case where a rank of patent evaluation is high so the patent is evaluated as not being likely to be invalidated, the warriors 220 may be generated to possess high-level items. The disposition section 42 may dispose the warriors 220 indicating an aspect of strength in the battlefield map 210 in descending order of ranks. An aspect of strength is expressed by an item such that, for example, a warrior 220 possessing a gun may be generated if the rank is high, and warriors 220 may be generated such that item levels become lower in stages as the ranks get lower, like warriors possessing a sword to a club and to bare hands.

The above-described variety of types (aspects) of warriors 220 and food are stored and the items are associated with levels respectively in the storage unit 60. In addition, the generation section 41 is configured to generate an item (a weapon, food, or the like) of a warrior 220 according to a predetermined level when a level reaches the predetermined level.

In addition, the generation section 41 may change outfits of the warriors 220 to national costumes of an application country according to the application country of the instruction information and patent information or the nationality of the inventor as illustrated in FIG. 5E. Accordingly, it is easily ascertained in which country the application has been filed. The variety of types (aspects) of warriors 220 is stored and the application country of the instruction information and patent information and the nationality of the inventor are associated with national costumes of the countries in the storage unit 60. In addition, the generation section 41 is configured to generate the warriors 220 wearing the national costumes corresponding to the countries according to the application country or the nationality.

It is possible to ascertain a set of similar technical fields at a glance by disposing warriors close to each other or changing the appearances of the warriors 220 to various forms as described above. In addition, by changing the topography of the battlefield map 210, the technical field, the year of application, the year of registration, and the like of the instruction information and patent information can be easily ascertained, and technology trends of a specific company can be visually recognized. Furthermore, not only can technology trends of the subject company be recognized, but also comprehensive technology trends including strength, weakness, and blank areas of technologies of each company can be instantly ascertained and effectively used for management and business strategies of the subject company.

Moreover, with respect to published patents that have not gained rights, appearances and features of the warriors 220 are changed according to responses in the process of examination thereafter and the times of right acquisition, and thus the process of growing the warriors 220 can be visually recognized.

Since appearances and features of the warriors 220 are changed according to levels as described above, it is possible to promote motivation to create inventions.

FIG. 6 is a flowchart showing an example of an operation of the patent map display device 1 according to the first embodiment of the present invention.

The bibliographic database 20 stores a plurality of pieces of prior patent information, and a user inputs instruction information representing an evaluation target into an input field of the user terminal 100 as shown in FIG. 6 (S1). The instruction information is information indicating the contents of the technology to be evaluated and including keywords by which the technical contents can be specified. The user can input not only the technical contents representing the evaluation target but also technology classification such as the IPC or time information such as the date of application. When the instruction information is input to the input field of the user terminal 100, the patent map display device 1 acquires the instruction information. The acquisition of the instruction information is performed by the information acquisition unit 10.

Next, the analysis unit 30 analyzes the instruction information representing the evaluation target acquired in S1 on the basis of the acquired instruction information (S2).

Specifically, the comparison section 31 included in the analysis unit 30 compares the instruction information representing the evaluation target acquired in S1 with the plurality of pieces of prior patent information stored in the bibliographic database 20. Determination on whether the plurality of pieces of patent information and the instruction information have similar technical contents is made using, for example, the degree of matching in the International Patent Classification (IPC) given to the patent information by comparing the instruction information and the patent information.

In addition, the determination on whether the plurality of pieces of patent information and the instruction information have similar technical contents may be made through comparison of relevance of technical wordings included in the instruction information representing the evaluation target and the plurality of pieces of patent information stored in the bibliographic database 20. A technical wording refers to a sentence, a combination of a plurality of clauses, a clause, or a word included in technical information. Furthermore, the determination is made by the comparison section 31, and determination on whether the information has similar technical contents may be made by comparing a difference between sentences included in the instruction information and the plurality of pieces of prior patent information.

Next, the evaluation section 32 evaluate the instruction information on the basis of the comparison results. The evaluation is performed by inputting the comparison results to the evaluation section 32.

By evaluating the instruction information as described above, the evaluation that is likely to bring a result closer to an actual examination result is possible. That is, comparison and evaluation of the instruction information representing the evaluation target with the patent information including technical wordings that are different but indicate the same meaning are possible, and thus the evaluation that is likely to bring a result closer to an actual examination result is possible.

Next, the generation section 41 generates a battlefield map 210 and warriors 220 representing attributes of the instruction information on the basis of attribute information including the patent evaluation analyzed in S2 (S3). A plurality of types of battlefield maps 210 and warriors 220 are stored in the storage unit 60 in association with attribute information, and thus the battlefield map 210 and the warriors 220 that match the attribute information can be generated.

Specifically, pieces of the attribute information are associated with the plurality of types of battlefield maps and warriors respectively, and the battlefield map 210 and the warriors 220 representing the attributes related to the analysis result obtained by the comparison and the evaluation of the instruction information and the plurality of pieces of prior patent information by the analysis unit 30 are generated.

Next, the disposition section 42 generates a patent map 200 by disposing the warriors 220 generated in S3 in the battlefield map 210 (S4). Further, the disposition section 42 may change the disposition relation of the warriors 220 according to the degree of matching or the degree of similarity between technical contents of the instruction information and the prior patent information. For example, in a case where the technical contents of the instruction information and the patent information have a similarity, the warriors may be disposed close to each other.

By disposing the warriors close to each other as described above, a set of similar technical fields can be ascertained at a glance. Technical trends of specific companies can be visually recognized instantaneously. Moreover, application trends of the subject company or a specific company can be easily recognized from the technology trends, and comprehensive technology trends including strength, weakness, and blank areas of technologies of each company can be instantly ascertained and can be effectively used for management and business strategies of the company.

The patent map 200 generated in S4 in the above described flow is displayed in the input field of the user terminal 100 (S5). The display of the patent map 200 is performed by the display unit 50. For example, when the display unit 50 outputs an output instruction to the patent map generation unit 40, an image of the patent map 200 is output to and displayed on the user terminal 100.

FIG. 7 is a diagram illustrating an example of an aspect in which a band-shaped information bar 300 is displayed on the patent map 200. The generation section 41 has a function of generating the information bar 300 representing a time axis indicating change of time. It may be configured that, the warriors 220 can be disposed and the information bar 300 can also be disposed in the direction of the passage of time (the direction of the arrow from the year of 2000 to the year of 2020 in FIG. 7) in the map 210 according to the passage of time as illustrated in FIG. 7. The disposition is performed by the disposition section 42. The information bar 300 refers to the time axis indicating change of time. A patent map 200' generated due to the above-described disposition is displayed on the user terminal 100. The display on the user terminal 100 is performed by the display unit 50.

Since the information bar 300 is disposed in the battlefield map 210 in addition to the warriors 220 in the direction of the passage of time as described above, the user can easily ascertain the background (trends) of ideas created in the past. The patent map 200' generated (created) as described above is stored in the storage unit 60, and the user can view the patent map 200' indicating the time series tendency (trends) at the time when the user created the ideas anytime. The ideas include published patents, unpublished patents, and patents for which application has not been filed (including invention pending application, invention for which application was abandoned, and know-how).

Accordingly, application trends of technologies and technology trends of the subject company, and the like can be visually recognized, and fields of technologies of the subject company under sufficient protection and insufficient protection can be clearly ascertained. Therefore, fields in which inventions should be created in the future and protection of patents should be strengthened can be identified and thus future applications can be predicted.

Furthermore, the information bar 300 on the time axis indicating change of time can be displayed in the patent map 200' based on analysis results of technologies of the subject company as well as other companies. Accordingly, application trends, technology trends, and the like that chronologically fit to the time can be recognized, and comprehensive technology trends including strength, weakness, and blank areas of technologies of each company can be instantly ascertained. Therefore, the trends can be effectively used for management and business strategies of the company.

In addition, according to the present embodiment, technical fields and evaluation (strength of inventions) can be recognized at a glance due to the topography of the battlefield map 210 and the appearances of the warriors 220 such as, for example, colors of outfits of the warriors, weapons possessed by the warriors, ages of the warriors, and the like. Therefore, chronological trends in applications, technologies, and the like can be easily recognized. With the patent map display device 1, the user can predict future application trends.

Furthermore, the technology trends of the subject company can also be illustrated as an overhead view 230 as illustrated in FIG. 8A. The horizontal axis represents affinity with a technology of the subject company, and the vertical axis represents marketability. It is possible to recognize promising business areas at a glance.

In addition, core technologies of the subject company and peripheral technologies of other companies can be illustrated as a chart 240 as illustrated in FIG. 8B. Accordingly, future candidate business areas can be predicted.

According to the present embodiment, the patent map 200, the overhead view 230, and the chart 240 can be arbitrarily switched and displayed on the user terminal 100. The switching is performed by a switching unit (not illustrated) included in the user terminal 100.

Further, according to the patent map display device 1 of the present embodiment, the warriors 220 can move on the battlefield map 210. The movement is operated by, for example, a control unit (not illustrated) included in the patent map display device 1. The control unit may change movement distances of the warriors 220 according to patent evaluation based on analysis results. The movement determines, for example, a degree of similarity between the technical contents to be evaluated and a plurality of pieces of patent information according to a degree of matching between the technical contents to be evaluated and the plurality of pieces of patent information. The control unit (not illustrated) may perform control such that the warriors 220 can move in a wide area on the map 210 in a case where a degree of similarity is high. In addition, the control unit (not illustrated) may perform control such that the warriors 220 moves only in a narrow area on the map 210 in a case where a degree of similarity is low. The control unit (not illustrated) performs control such that the warriors 220 can arbitrarily move with a movement area. A degree of similarity may be determined on the basis of the number of letters in the claims. The number of letters in the claims is counted by, for example, the totalizing unit (not illustrated) included in the patent map display device 1. For example, neighboring warriors 220 may be caused to fight each other in a case where the applicants are different, or a warrior may be caused to fight another warrior in a case where they encounter while moving. An applicant holding a highly evaluated patent can be easily ascertained. The control unit (not illustrated) has a function of enabling the warriors 220 to move within a movement area. For example, the control unit (not illustrated) can perform control such that the warriors 220 autonomously move in a movement area preset corresponding to patent evaluation. The storage unit 60 can stores a plurality of types of movement areas corresponding to patent evaluation. It is possible to control the warriors 220 such that the warriors autonomously move in a preset movement area corresponding not only to patent evaluation but also to a level or a rank.

The control unit (not illustrated) executes functions realized according to codes or commands included in program and is, for example, a central processing unit or a microprocessor, a processor core, a multiprocessor, an application-specific integrated circuit (ASIC), or a field programmable gate array (FPGA). Further, in the present invention, the control unit (not illustrated) is not limited thereto. The control unit (not illustrated) may include a random access memory (RAM), a read only memory (ROM), and the like. The control unit (not illustrated) causes a program stored in the ROM to be expanded in the RAM and causes the CPU to perform a correspond process.

With the above-described configuration, it is possible to visually ascertain the size of the scope of rights of the technology to be evaluated input by the user. Further, with respect to patent evaluation, detectability of easy infringement and invalidity have different output forms respectively. That is, a patent with a high degree of similarity is likely to have a wide scope of rights, likely to have rights that are easy to exercise, and less likely to avoid infringement. On the other hand, such a patent has a high probability of invalidation. In this case, the warriors 220 may possess a club of a low level as an item. In addition, a patent with a low degree of similarity is likely to have a narrow scope of rights, likely to have rights that are difficult to exercise, and likely to avoid infringement. On the other hand, such a patent has a low probability of invalidation. In this case, the warriors 220 may possess an ax of a high level as an item. The above-described variety of types (aspects) of warriors 220 are stored and such items are associated with each degree of similarity in storage unit 60. In addition, when a level reaches a predetermined level, the generation section 41 is configured to generate an item (weapon, etc.) of the warriors 220 according to the level.

In addition, although the case where the patent map 200 is expressed by disposing the warriors 220 in the battlefield map 210 of which a topography is a virtual battlefield has been described above in the present embodiment, the present invention is not limited thereto.

Furthermore, although a patent map has been described as a support tool for patent analysis in the present embodiment, the present invention is not limited thereto. The present invention can of course be used as a support tool for design analysis and trademark analysis in addition to patent analysis. Content input to an input field of a user terminal by a user may be an original draft of an application for design registration, an application for trademark registration, or the like or may be a memo in which information of intellectual property is described, a keyword related to intellectual property, a document of an application for trademark registration, an application for design registration, an application for a patent, an application for utility model registration that have been created or is being created, or the like.

Represent examples of the embodiment have been described above, and the present invention is not limited thereto.

What is claimed is:

1. A patent map display device that displays a patent map on a user terminal that can be operated by a user, the patent map display device comprising:
    a bibliographic database that stores prior patent information;
    an information acquisition unit that acquires instruction information input to the user terminal by the user;
    an analysis unit including a comparison section that compares the instruction information with the patent information and an evaluation section that performs patent evaluation of the instruction information by comparing the instruction information with the patent information on the basis of the comparison section;
    a patent map generation unit including a generation section that generates a map and a character representing an attribute related to an analysis result of the instruction information on the basis of attribute information including the patent evaluation and a disposition section that disposes the character in the map; and
    a display unit that displays a patent map generated by the patent map generation unit.

2. The patent map display device according to claim 1 further comprising:
    a totalizing unit that extracts and totalizes the number of pieces of the instruction information and the patent information and attributes on the basis of the analysis result.

3. The patent map display device according to claim 2,
    wherein the totalizing unit has a function of totalizing the number of letters of the claims of the patent information,
    wherein the patent evaluation is determined according to the number of letters of the claims of the patent information.

4. The patent map display device according to claim 2,
    wherein the patent map generation unit determines an attribute related to the character on the basis of the attribute information, and
    wherein the totalizing unit determines the number of characters according to the number of pieces.

5. The patent map display device according to claim 2,
    wherein the totalizing unit performs extraction and totalization on the analysis result for each of same inventors or applicants, and
    wherein the patent map generation unit disposes the characters close to each other for each of same inventors or applicants on the basis of the extraction and totalization result.

6. The patent map display device according to claim 2,
    wherein the totalizing unit performs extraction and totalization on the analysis result for each of different inventors or applicants, and
    wherein the patent map generation unit changes a color of an outfit of the characters for each of different inventors or applicants on the basis of the extraction and totalization result.

7. The patent map display device according to claim 2
    wherein the totalizing unit performs extraction and totalization on a technology classification on the basis of the attribute information, and
    wherein the patent map generation unit determines an appearance of the characters for each of technically similar technology classifications on the basis of the extraction and totalization result and disposes the characters close to each other.

8. The patent map display device according to claim 2, wherein the totalizing unit performs extraction and totalization on patent evaluation on the basis of the attribute information, and
wherein the patent map generation unit determines a level of an item possessed by the character or the character for each occasion of the patent evaluation on the basis of the extraction and totalization result.

9. The patent map display device according to claim 7, wherein the totalizing unit sets a classification group for each of the technically similar technology classifications on the basis of the extraction and totalization result of the technology classifications, and
wherein the patent map generation unit determines a topography of the map for each of the classification groups.

10. The patent map display device according to claim 9, wherein the attribute information includes a technology classification or time information, and
wherein the patent map generation unit changes the appearance of the characters and the topography of the map according to the technology classification or the time information.

11. The patent map display device according to claim 9, wherein the attribute information includes a technology classification or time information, and
wherein the patent map generation unit disposes, on topographies of different maps for each of the classification groups, a character corresponding to the technology classification or the time information corresponding to the topography.

12. The patent map display device according to claim 1 further comprising:
a control unit that controls movement of the character,
wherein the character can move on the map according to the analysis result, and
wherein the control unit performs control such that the character moves in a wide area in a case where patent evaluation based on the analysis result is high and that a movement area of the character becomes narrower in a case where patent evaluation based on the analysis result is low.

13. The patent map display device according to claim 1, wherein the patent map generation unit has a function of generating an information bar representing a time axis indicating change of time, and
wherein the disposition section disposes the character on the map according to passage of time and can dispose the information bar in a direction of the passage of time.

14. The patent map display device according to claim 1, wherein the patent map generation unit changes a level of a character according to rank information of the patent evaluation.

15. The patent map display device according to claim 1, wherein, when the rank information of the patent evaluation indicates a level equal to or higher than a predetermined level, the patent map generation unit disposes a character in a shape simulating a warrior, a beast, a carnivore, a large animal, a tank, or a robot according to the level.

16. The patent map display device according to claim 1 wherein the analysis unit identifies an application country or a nationality of an inventor on the basis of the attribute information, and
wherein the patent map generation unit changes an outfit of the character to a national costume of the application country or the nationality of the inventor according to the application country or the nationality of the inventor.

17. The patent map display device according to claim 1, wherein the user can include information of an organization to which the inventor belongs at a time of input of the instruction information, and
wherein the patent map generation unit identifies the organization to which the inventor belongs on the basis of the information of the organization and determines an outfit of the character for each organization.

18. The patent map display device according to claim 1, wherein the user can include asset information of each organization to which the inventor belongs at the time of input of the instruction information, and
wherein the patent map generation unit determines an accumulation amount of food of the character on the basis of the asset information and disposes the food in the accumulation amount in the map together with the character.

19. The patent map display device according to claim 1, wherein the analysis unit identifies a date of application on the basis of the attribute information, and
wherein the patent map generation unit changes an age of the character according to the identified date of application.

20. A patent map display method for displaying a patent map on a user terminal that can be operated by a user, the patent map display method comprising,
a step of storing prior patent information in a bibliographic database;
an input step of inputting instruction information by the user;
an analysis step including a comparison step of comparing the instruction information with the patent information and an evaluation step of performing patent evaluation of the instruction information by comparing the instruction information with the patent information on the basis of the comparison step;
a patent map generation step including a generation step of generating a map and a character representing an attribute related to an analysis result of the instruction information on the basis of attribute information including the patent evaluation and a disposition step of disposing the character in the map; and
a display step of displaying a patent map generated from the patent map generation step.

* * * * *